Jan. 10, 1950      W. M. ROSS      2,494,206
ELECTRICAL MEASURING INSTRUMENT
Filed April 23, 1946
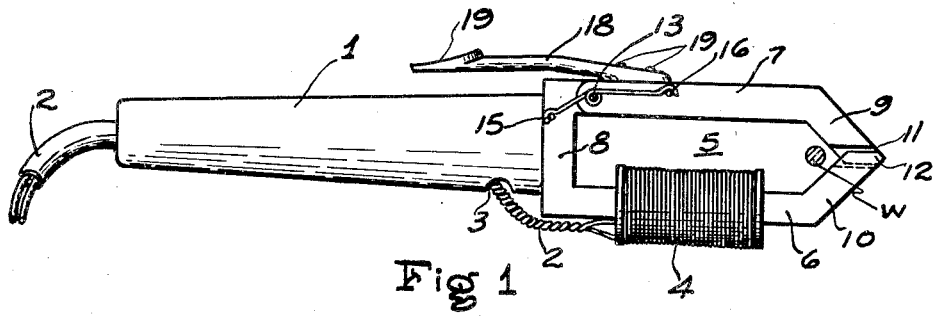
Fig 1
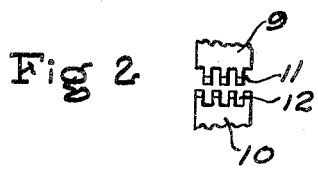
Fig 2
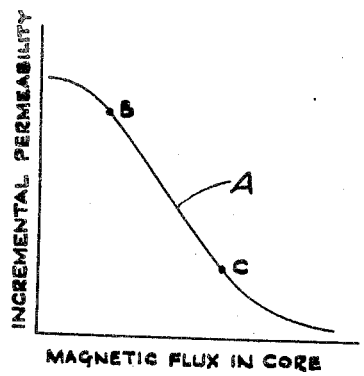
Fig 3
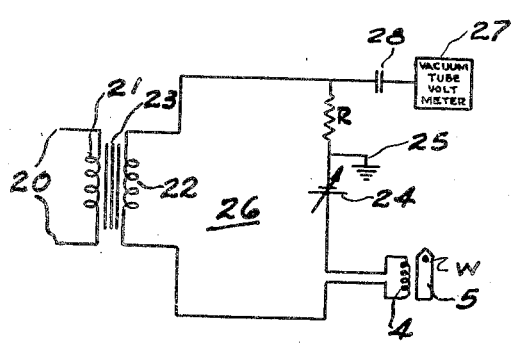
Fig 4
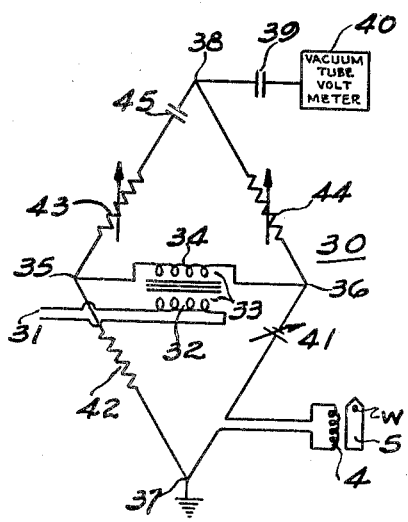
Fig 5
INVENTOR.
WAYNE M. ROSS
BY

Patented Jan. 10, 1950

2,494,206

UNITED STATES PATENT OFFICE 2,494,206

ELECTRICAL MEASURING INSTRUMENT

Wayne M. Ross, Wallace, Idaho

Application April 23, 1946, Serial No. 664,397

2 Claims. (Cl. 175—358)

This invention relates generally to electrical measuring instruments, and particularly to electrical measuring instruments for determining the magnitude of direct current flowing in a conductor, without requiring the opening of the circuit of that conductor for the purpose of measuring current flow therein.

Generally, my novel measuring device determines the magnitude of a direct current by causing that direct current to modify or vary the incremental permeability of a magnetic circuit. The magnetic circuit is supplied with alternating voltage of a predetermined value, which produces a predetermined current flow in a coil associated with the magnetic circuit. A change in the incremental permeability of the magnetic circuit results in a change in the value of the alternating current flow, which may be detected or measured in various well known manners.

It is, accordingly, an object of my invention to provide devices for measuring the magnitude of a direct current without opening the circuit in which the direct current flows.

It is a further object of the invention to provide a device of the above character which shall be economical of construction, and which shall not be subject to maintenance difficulties, and which shall be readily operated by relatively untrained personnel.

Still a further object of the invention is the provision of a device of the above character which shall be operable from commercial voltage supplies, although not limited to such operations.

It is another object of the invention to provide a direct current measuring equipment which may be applied to a single strand of wire of a wide variety of dimensions, and which may be so applied by a single simple operation, susceptible of accomplishment by a single hand of an operator.

The above and still further objects and advantages of my invention will become apparent upon study of the following detailed description of an embodiment of my invention, when taken in conjunction with the accompanying drawings, and will be particularly pointed out in the appended claims.

In the drawings:

Figure 1 is a side elevational view of an embodiment of the device associated with my invention;

Figure 2 is a fragmentary end view, taken from the right, of Figure 1;

Figure 3 is a curve utilized hereinafter to aid in the exposition of my invention;

Figure 4 is a circuit diagram illustrating one mode of practising my invention; and Figure 5 is a further circuit diagram illustrating another mode of practising my invention.

Referring now specifically to Figure 1 of the drawings, I represents a hollow tubular handle of a probe, into one hollow end of which extends a two wire cord 2, which emerges from the handle 1 through an aperture 3 and supplies current to a coil 4, comprising many turns of fine wire.

The coil 4 surrounds one leg 6 of a magnetic circuit device 5 which may take various shapes, but which as illustrated comprises a pair of substantially parallel legs 6, 7 pivotally joined at one end by a transverse member 8, the latter being joined to the handle 1 in any convenient manner. The end of the device 5 which is remote from the transverse member 8 is formed of a pair of converging arms, 9 and 10, which are respectively integral with each of the legs 6 and 7, and which, in one position of my device, are in close and abutting proximity at their point of convergence.

In order to assure sufficiently close and proximate relationship between the convergent ends of the arms 9 and 10 I prefer to serrate the adjacent or abutting ends 11 and 12 thereof, or to provide interlocking slots therein, this feature being clearly illustrated in Figure 2 of the drawings.

The leg 7 is pivotally secured to the transverse member 8 by means of a pin 13, extending through leg 7 and member 8, and is normally biased into parallel relation with leg 6 by means of a spring 14, centered on the pin 13 and having ends locked respectively on pins 15 and 16, pin 15 being provided in the member 8 and pin 16 in the leg 7. A convenient actuating member for the leg 7 is provided in the form of a lever 18, secured to the leg 7 by means of screws 19 and extending rearwardly therefrom, parallel to the handle 1. The lever 18 terminates in a button 19 adapted to the shape of the human thumb, and which may be depressed in order to pivotally actuate the leg 7.

Figure 3 illustrates the variations in incremental permeability which may be expected as the flux in a magnetic circuit is varied, B and C being two points which are substantially linearly related on the incremental permeability characteristic A. For points above B and below C on the characteristic the curve is not linear and hence does not lend itself to simple measurement.

Referring now to Figure 4 of the drawings, 20 represents a source of alternating current, which may be at commercially available voltage and current if desired. The voltage from source 20 is applied via primary 21 to secondary 22 of the transformer 23, and from the secondary 23 is applied in a series circuit including a resistance R, and adjustable D. C. source 24 and the coil 4, heretofore described in connection with Figure 1. The point of connection between source 24 and resistance R is grounded at 25.

It will be clear that the alternating current flowing in the series circuit including secondary 22, resistance R, source 24 and coil 4, and generally denominated by the numeral 26, will be determined by the incremental permeability of the magnetic circuit 5 associated with the coil 4, and which may be adjusted to the value B (Figure 3) by adjusting the source 24. Upon introducing a D. C. current carrying conductor W adjacent the arms 9, 10, a superposed invarying magnetic flux is introduced in the magnetic circuit 5, which changes the incremental permeability of the circuit 5 and hence the value of the alternating current flowing in the circuit 26. The value of this current change may be determined in various ways, but I prefer to utilize a vacuum tube voltmeter 27 coupled to one end of resistance R by means of a coupling condenser 28.

For obtaining greater sensitivity than is feasible with the circuit 26 I utilize a bridge circuit 30, illustrated in Figure 5 of the drawings.

The input voltage source 31 is connected to the primary 32 of a transformer 33, the secondary 34 of said transformer being coupled across two poles 35 and 36 of the bridge circuit, the opposed poles 37 and 38 of which are respectively grounded and coupled via a coupling condenser 39 to a vacuum tube voltmeter 40, or similar device.

The coil 4 and a variable source of direct voltage 41 are connected in one leg of the bridge 30, and the bridge is normally balanced by selecting suitable values for resistances 42, 43, and 44 and for condenser 45, in a manner well known per se, in the absence of the current carrying conductor W in the magnetic circuit 5.

Upon introduction of conductor W in the magnetic circuit 5, any current flowing in the conductor W serves to vary the value of the incremental permeability of the circuit 5 and thereby to unbalance the bridge 30 to an extent determined by the value of the current in the conductor W.

Since, in both the embodiment of my invention illustrated in Figure 4 and that illustrated in Figure 5, the operation takes place on a straight line portion of the characteristic curve A illustrated in Figure 3, the readings of the instruments 27 and 40 may be interpreted directly in terms of current values, after calibration of the instruments with one known value of current.

While I have described certain specific embodiments of my invention, it will be clear that variations of the arrangements and structural details disclosed may be resorted to without departing from the spirit and scope of the invention as defined in the appended claims.

What I claim and desire to secure by Letters Patent of the United States is:

1. A device for use in measuring a current flowing in a line conductor, said device comprising a longitudinally-elongated non-conductive handle, a reclining L-shaped magnetically permeable arm having the short leg thereof secured cross-wise to one end of said handle with the long leg of said arm projecting forwardly from said end of said handle, a second magnetically permeable arm arranged in parallel spaced relation with respect to the long leg of said L-shaped arm having one end pivoted to the adjacent end of the short leg of the latter L-shaped arm, the other end of said second arm and the adjacent end of the long leg of said L-shaped arm terminating in converging terminals arranged to engage to close the magnetic circuit comprising said arms, spring means operating between said second arm and the short leg of said L-shaped arm yieldably maintaining said second arm with its terminal in engagement with the terminal of the long leg of said L-shaped arm, a coil circumposed on the long leg of said L-shaped arm, and a lever secured to said second arm and extending rearwardly therefrom and arranged to be compressed toward said handle while said handle is held in the hand for pivoting said second arm laterally away from the long leg of said L-shaped arm against resistance of said spring means to enable placement of the line conductor between the arms.

2. A device for use in measuring a current flowing in a line conductor, said device comprising a longitudinally-elongated non-conductive handle, a reclining L-shaped magnetically permeable arm having the short leg thereof secured cross-wise to one end of said handle with the long leg of said arm projecting forwardly from said end of said handle, a second magnetically permeable arm arranged in parallel spaced relation with respect to the long leg of said L-shaped arm having one end pivoted to the adjacent end of the short leg of the latter L-shaped arm, the other end of said second arm and the adjacent end of the long leg of said L-shaped arm terminating in converging terminals arranged to engage to close a magnetic circuit comprising said arms, spring means operating between said second arm and the short leg of said L-shaped arm yieldably maintaining said second arm with its terminal in engagement with the terminal of the long leg of said L-shaped arm, a coil circumposed on the long leg of said L-shaped arm, and a lever secured to said second arm and extending rearwardly therefrom and arranged to be compressed toward said handle while said handle is held in the hand for pivoting said second arm laterally away from the long leg of said L-shaped arm against resistance of said spring means to enable placement of the line conductor between the arms, the facing surfaces of said terminals being formed with spaced tongues and grooves arranged to inter-engage while said arms are in magnetic circuit forming relation in a manner to enhance the continuity of said magnetic circuit.

WAYNE M. ROSS.

REFERENCES CITED

The following references are of record in the file of this patent:

UNITED STATES PATENTS

| Number | Name | Date |
| --- | --- | --- |
| 1,569,723 | Dickinson | Jan. 12, 1926 |
| 1,830,541 | Harris | Nov. 3, 1931 |
| 1,906,812 | Rowell | May 2, 1933 |
| 1,924,039 | Hockley | Aug. 22, 1933 |
| 2,266,624 | Hall | Dec. 16, 1941 |
| 2,323,996 | Hubbard | July 13, 1943 |
| 2,326,909 | Wolferz et al. | Aug. 17, 1943 |
| 2,362,372 | Halfmann | Nov. 7, 1944 |
| 2,375,591 | Schweitzer, Jr. | May 8, 1945 |

FOREIGN PATENTS

| Number | Country | Date |
| --- | --- | --- |
| 344,575 | Great Britain | Mar. 12, 1931 |